(No Model.)
J. E. WRIGHT.
SAFETY BICYCLE.
No. 501,454. Patented July 11, 1893.
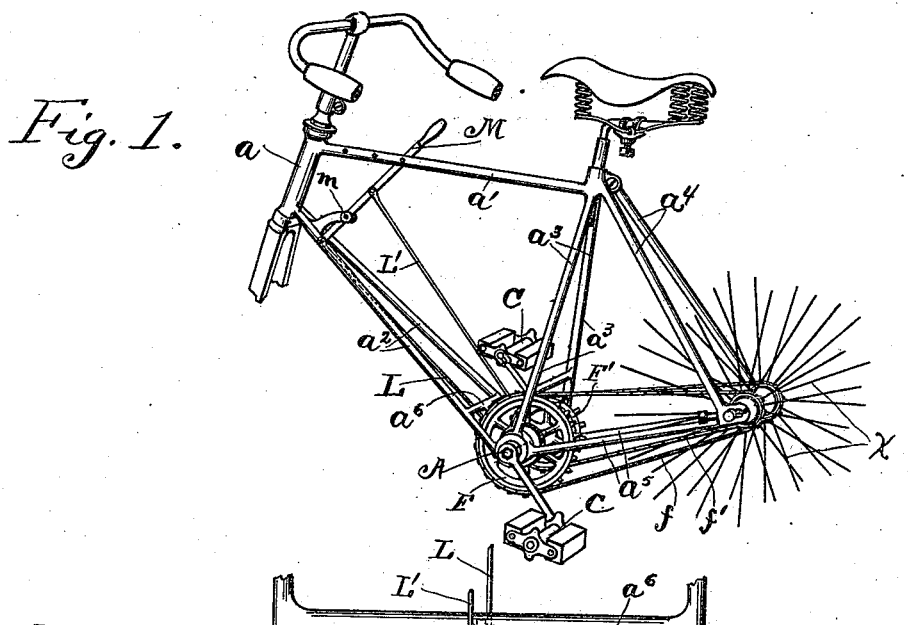
Fig. 1.
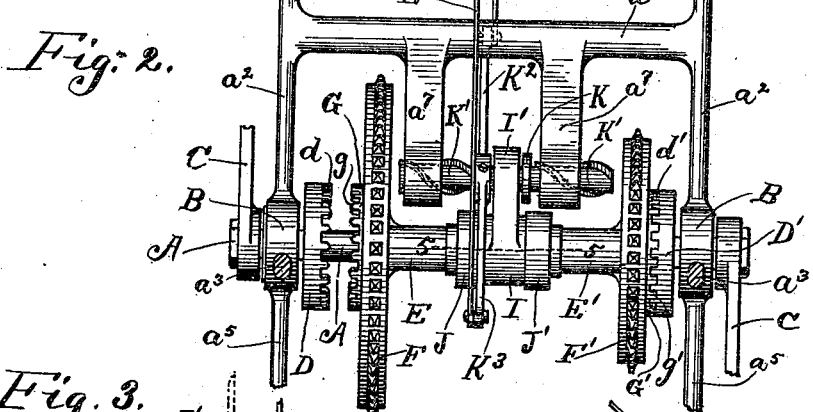
Fig. 2.
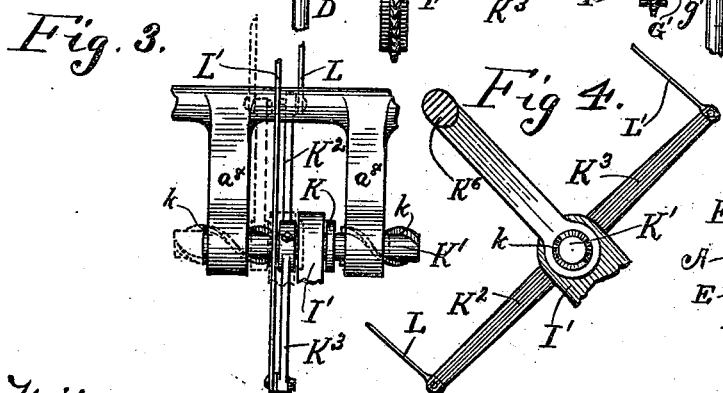
Fig. 3.
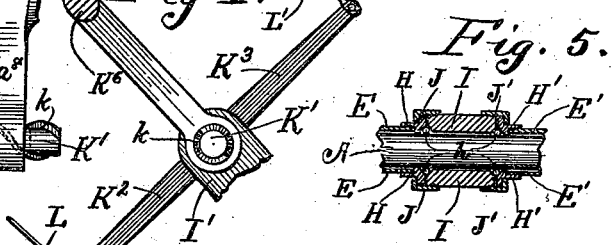
Fig. 4.
Fig. 5.
Witnesses:
R. J. Jacker.
Flora L. Brown.
Inventor:
Judson E. Wright,
By Charles Turner Brown,
Atty.

UNITED STATES PATENT OFFICE.

JUDSON E. WRIGHT, OF CHICAGO, ILLINOIS, ASSIGNOR OF ONE-HALF TO WILLIAM B. MOORE, OF SAME PLACE.

SAFETY-BICYCLE.

SPECIFICATION forming part of Letters Patent No. 501,454, dated July 11, 1893.

Application filed August 13, 1892. Serial No. 442,993. (No model.)

*To all whom it may concern:*

Be it known that I, JUDSON E. WRIGHT, residing in the city of Chicago, in the county of Cook and State of Illinois, have invented certain new and useful Improvements in Safety-Bicycles, of which the following, when taken in connection with the drawings accompanying and forming a part hereof, is a full and complete description, sufficient to enable those skilled in the art to understand, make, and use the same.

The object of my invention is to obtain a device whereby when the pedal shaft of a safety bicycle is revolved at a given rate of speed the wheel of such bicycle driven by such pedal shaft may be made to revolve at different, although determined rates of speed, thereby enabling the person mounted on such safety bicycle to travel at a greater rate of speed with a given speed of the pedal shaft when traveling upon a road which presents low resistance to the forward movement of the bicycle than when traveling on a road presenting great resistance to such forward movement of the bicycle, by adjusting the several parts embodying my invention in proper manner and as will be hereinafter described.

A further object of this invention is to construct a shifting mechanism forming part of the device embodying my invention whereby the several parts on the pedal shaft of a safety bicycle are controlled, such shifting mechanism being disposed so as to be readily actuated by the person mounted on the bicycle.

A further purpose is to obtain a device embodying my invention, which shall be simple in construction, light in weight, and durable and certain in its operation.

In the drawings referred to as forming a part of this specification—Figure 1, is a perspective view of the main part or portion of the frame of a safety bicycle including all thereof to which my device relates, with a portion of the rear or driving wheel of the bicycle, and a perspective view of the device embodying my invention contained in such frame and connected with such driving wheel; Fig. 2, a top plan view of the pedal shaft with the several parts embodying my invention placed thereon, and a view of the portion of the frame of the device supporting the pedal shaft and the shifting mechanism of the device; Fig. 3, a plan view on an enlarged scale of the portion of the frame supporting the shifting mechanism forming part of the device embodying my invention, with such shifting mechanism illustrated in one position by full lines, and in a second position by broken lines; Fig. 4, a side elevation of a portion of the shifting device, and Fig. 5 a sectional view on line 5—5 of Fig. 2.

The same letter of reference is used to indicate a given part where more than one view thereof is shown in the several figures of the drawings.

I have illustrated the device embodying my invention as attached to a safety bicycle wherein the frame consists of the several parts $a$, $a'$, $a^2$, $a^2$, $a^3$, $a^3$, $a^4$, $a^4$, $a^5$, $a^5$, and $a^6$, although the construction of the frame in this manner constitutes no part of my invention, and is a construction well known in the art.

A, is the pedal shaft.

B, B, are the journal bearings, in which pedal shaft A revolves. Journal bearings B, B, may, and of course, should be, provided with the ordinary ball bearings.

C, C, are the pedals.

D, D', are clutch disks rigidly secured on pedal shaft A, having on the face or side thereof, respectively, teeth $d$, $d$, $d'$, $d'$.

E, is a sleeve loosely mounted on shaft A so as to turn freely thereon, and also to slide or be slid longitudinally on such shaft.

F, is an ordinary chain sprocket wheel rigidly secured on sleeve E, and having chain $f$ passing thereover and extending over and around a sprocket wheel on the hub of the driving wheel of the bicycle in the ordinary manner, so that revolution of the wheel F will actuate such driving wheel (lettered X).

G, is a ring, disk or wheel (hereinafter termed wheel G), also rigidly secured to sleeve E or to sprocket wheel F, as preferred; and $g$, $g$, are teeth on the face of the wheel G corresponding with the teeth $d$, $d$, on the face of clutch disk D. The purpose of the teeth $d$, $g$, it will be evident, is, that when the sleeve E is slid in any manner on the shaft A, so that wheel G shall be in contact with clutch disk D, the teeth $d$, $g$, may engage and rotation of clutch disk D, which is rigidly attached, as described, on the pedal shaft, may produce certain rotation in unison therewith of wheel or disk G, sleeve E, and sprocket wheel F, and thereby cause propulsion of the bicycle. Hence, I do not confine myself to any particular form or shape of the teeth $d$, $g$, respectively. It will be also evident that if the wheel G is rigidly secured to sprocket wheel F, such sprocket wheel may be placed loosely on the sleeve E, that is, so as to rotate thereon, but not so as to be movable longitudinally on such sleeve, as thereby when the sleeve E is moved longitudinally on shaft A engagement of wheel G with clutch disk D can be attained, and rotation of the sprocket wheel F in unison with the clutch disk D secured and the bicycle thereby propelled.

F' is a sleeve loosely mounted on pedal shaft A in the same manner as is mounted sleeve E on such pedal shaft; and F', is a sprocket wheel, similar to sprocket wheel F but smaller in diameter, mounted on sleeve E'.

G', is a disk or wheel secured to sleeve E' or to sprocket wheel F' having on the face thereof teeth $g'$, $g'$, adapted to intermesh with teeth $d'$, $d'$, of clutch disk D'.

$f'$, is a sprocket chain extending around sprocket wheel F' and around the sprocket wheel placed on the hub of the driving wheel X.

In the drawings, Fig. 2, I have illustrated the toothed clutch disk D' and wheel G', in close contact with each other and with the teeth $d'$, $d'$, and $g'$, $g'$, thereof, respectively, intermeshing, in which case the wheel G', sprocket wheel F', and sleeve E' to which such sprocket wheel F' and disk or wheel G' are illustrated as being rigidly secured, will rotate in unison with the rotation of the pedal shaft A, and hence, the bicycle will be propelled by such sprocket wheel F' and the chain $f'$ passing thereover.

In order to propel the bicycle at a faster rate of speed, the pedal shaft A moving at a uniform rate of speed, it is necessary to disengage the wheel G' from clutch disk D' and to place wheel G in engagement with clutch disk D. To do this, the sleeves E, E', are slid longitudinally on the pedal shaft A, and for the purpose of so sliding such sleeves, with the several wheels mounted thereon, I provide the following, which I deem a preferable mechanism: On the inner end of sleeve E there is secured the ring H, and on the inner end of sleeve E' is secured ring H'; and on pedal shaft A between rings H, H', there is loosely journaled arm I having projection I'. Balls $h$, $h$, are placed between the ring H and arm I, and also between ring H' and arm I, respectively, and adjacent to the shaft A, such balls serving as friction bearings, so called. On one end of the journal bearing of arm I there is rigidly secured ring J overlapping the ring H, and on the other end of the journal bearing of arm I there is secured the ring J' overlapping ring H'. Movement of the arm I longitudinally on shaft A to the right or left, will thus produce corresponding longitudinal movement of sleeves E, E', respectively. To secure this movement of arm I on shaft A, projection I' of the arm I extends over and around flanged hub K rigidly secured on shaft K'. Shaft K' is rotatable in its bearings $a^7$, $a^7$, such shaft having thereon, respectively, screw threads $k$, $k$, fitting into corresponding screw threads in the journal bearings. Crank arms $K^2$, $K^3$, are rigidly secured to shaft K'.

L, is a link connecting crank arm $K^2$ with the lower end of lever M.

L', is a link connecting crank arm $K^3$ with lever M on the other side of the pivotal point or fulcrum of such lever M to which the link L is connected. By this means, movement of the lever M, (Fig. 1) into the forward position in which it is illustrated in such figure exerts tension on rod L' connected with the crank arm $K^3$, and hub K to which the crank arms $K^2$, $K^3$, are rigidly attached, is brought into the position well illustrated in Fig. 3, and thereby the smaller one (G,) of the sprocket wheels G, G', made to propel the machine, as hereinbefore described.

In order to release the sprocket wheel G' from propelling the bicycle the lever M is drawn toward to the seat of the bicycle thereby causing lever L to draw on the crank arm $K^2$ and so partially revolve the grooved hub K, and shaft K'; such revolution of such shaft moving it longitudinally to the left, as viewed in Fig. 2, the movement of such shaft and hub K moving the arm I (by projection I' thereon extending around such hub K), and thus releasing teeth $g'$, $g'$, on wheel G' from teeth $d'$, $d'$, on clutch disk D. Slight movement of the lever M, as described, will move sleeves E, E', with wheels F, G, and F', G', secured thereto, respectively, longitudinally on the shaft in the manner stated, a sufficient distance to disengage the teeth $g'$, $g'$, of wheel G' from teeth $d'$, $d'$, of clutch disk D, but not sufficiently to cause teeth $g$, $g$, of wheel G to engage with teeth $d$, $d$, of clutch disk D. In this position neither one of the sprocket wheels F, F', will propel the bicycle, both of such sprocket wheels being out of engagement with the pedal shaft. Further movement of such lever M to the right, as viewed in Fig. 1, that is, toward the person riding the bicycle, will move sleeves E, E', and the several wheels secured thereon longitudinally to the left, as viewed in Fig. 2, so that the teeth $g$, $g$, of wheel G will engage with teeth $d$, $d'$, of clutch disk D, when the larger sprocket wheel, that is, sprocket wheel F, will propel the machine, such sprocket wheel being driven by clutch disk D on shaft A.

Having thus described my invention, what I claim as new, and desire to secure by Letters Patent, is—

In a safety bicycle, the combination of a pedal shaft, clutch disks rigidly secured to such shaft, and sleeves loosely mounted on such shaft, sprocket wheels mounted, respectively, on such sleeves, wheels or disks on the sides of such sprocket wheels, respectively, adapted to engage with the clutch disks rigidly secured on the pedal shaft, an arm journaled loosely on the pedal shaft between the sleeves thereon, such arm connected with the sleeves, respectively, so that movement of the arm longitudinally on the pedal shaft will produce longitudinal movement of such sleeves on such shaft, a second rotatable shaft having a screw thread thereon and corresponding screw threads in the journal bearings thereof, a flanged hub on such last named shaft and crank arms secured thereto, the arm extending around the pedal shaft connecting with the flanged hub on the second named shaft, a fulcrumed lever and links connecting such crank arms with such fulcrumed lever; substantially as described.

JUDSON E. WRIGHT.

In presence of—
W. B. MOORE,
FLORA L. BROWN.